Figure 1:
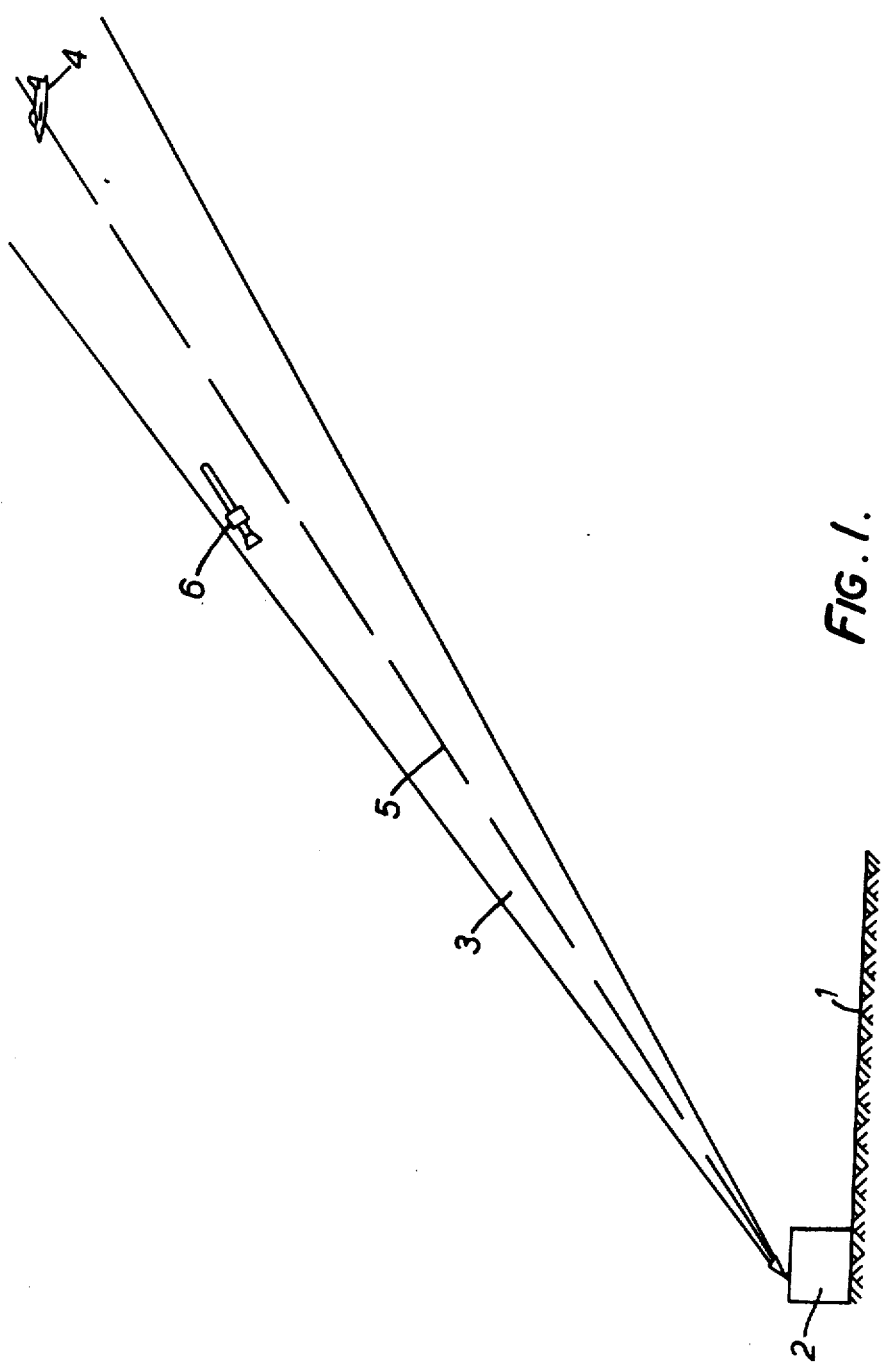

United States Patent [19]

Glenn

[11] 4,174,818
[45] Nov. 20, 1979

[54] GUIDANCE SYSTEMS FOR MOBILE CRAFT

[75] Inventor: Stephen J. Glenn, East Hanningfield, England

[73] Assignee: Elliott Brothers (London) Limited, Chelmsford, England

[21] Appl. No.: 759,535

[22] Filed: Jan. 14, 1977

[30] Foreign Application Priority Data

Jan. 29, 1976 [GB] United Kingdom ............... 3581/76

[51] Int. Cl.² .................... F41G 7/14; F41G 9/00; F41G 11/00; G01S 1/00
[52] U.S. Cl. .................................. 244/3.13; 244/3.16
[58] Field of Search ........................ 244/3.13, 3.16

[56] References Cited

U.S. PATENT DOCUMENTS

| 3,398,918 | 8/1968 | Girault | 244/3.13 |
| 3,416,751 | 12/1968 | Larson | 244/3.13 |
| 3,690,594 | 9/1972 | Menke | 244/3.13 |
| 3,782,667 | 1/1974 | Miller, Jr. et al. | 244/3.13 |
| 4,006,356 | 2/1977 | Johnson et al. | 244/3.16 |
| 4,030,686 | 6/1977 | Buchman | 244/3.13 |

FOREIGN PATENT DOCUMENTS 2659408 4/1977 Fed. Rep. of Germany .......... 244/3.13

*Primary Examiner*—Samuel W. Engle
*Assistant Examiner*—Thomas H. Webb
*Attorney, Agent, or Firm*—Diller, Ramik & Wight

[57] ABSTRACT

A missile is guided onto a target by means of a laser beam, so that the missile can determine and correct its displacement from the boresight of the laser beam. This leads to greater accuracy of guidance, and avoids the need for very narrow beams which could be lost by the missile.

17 Claims, 16 Drawing Figures

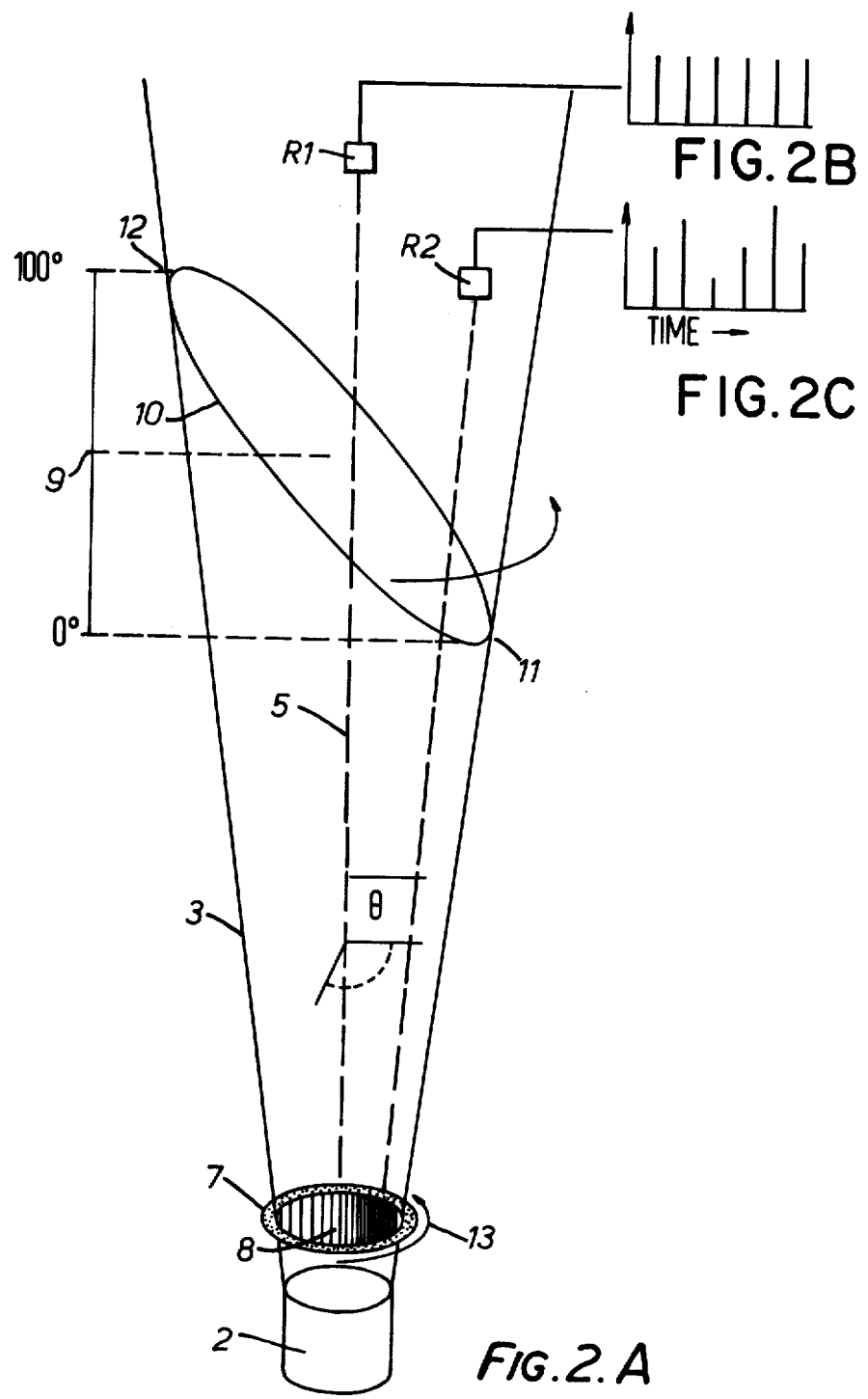

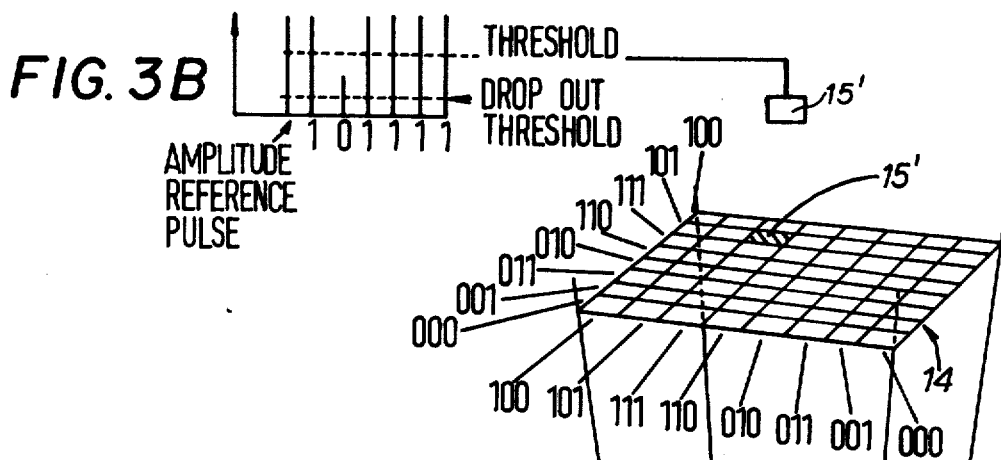
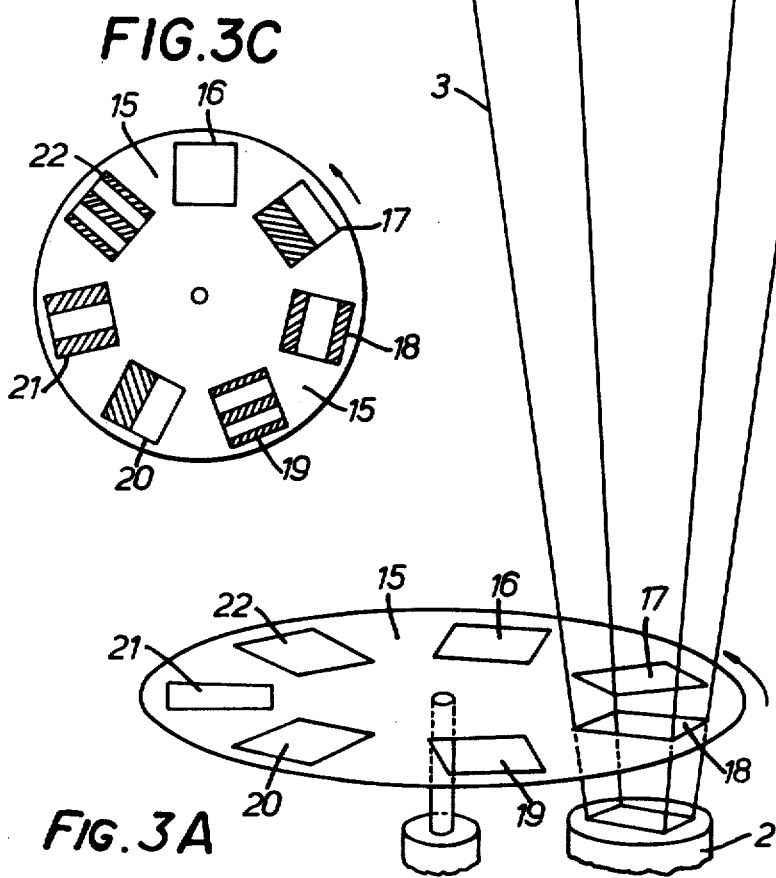

|     | 100    | 101    | 111    | 110    | 010    | 011    | 001    | 000    |
| --- | ------ | ------ | ------ | ------ | ------ | ------ | ------ | ------ |
| 100 | 100100 | 100101 | 100111 | 100110 | 100010 | 100011 | 100001 | 100000 |
| 101 | 101100 | 101101 | 101111 | 101110 | 101010 | 101011 | 101001 | 101000 |
| 111 | 111100 | 111101 | 111111 | 111110 | 111010 | 111011 | 111001 | 111000 |
| 110 | 110100 | 110101 | 110111 | 110110 | 110010 | 110011 | 110001 | 110000 |
| 010 | 010100 | 010101 | 010111 | 010110 | 010010 | 010011 | 010001 | 010000 |
| 011 | 011100 | 011101 | 011111 | 011110 | 011010 | 011011 | 011001 | 011000 |
| 001 | 001100 | 001101 | 001111 | 001110 | 001010 | 001011 | 001001 | 001000 |
| 000 | 000100 | 000101 | 000111 | 000110 | 000010 | 000011 | 000001 | 000000 |

FIG. 4.

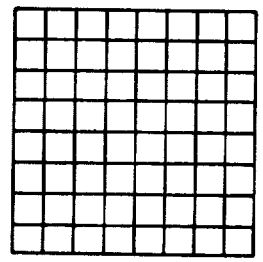
AMPLITUDE REFERENCE
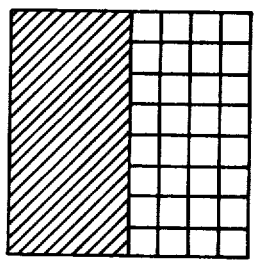
1st BIT
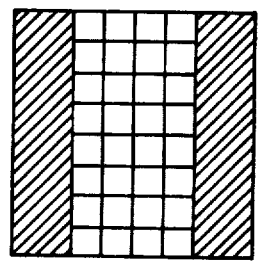
2nd BIT
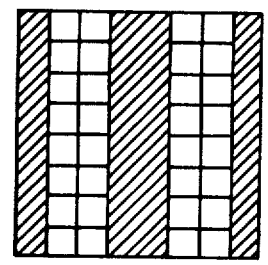
3rd BIT
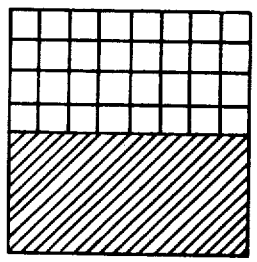
4th BIT
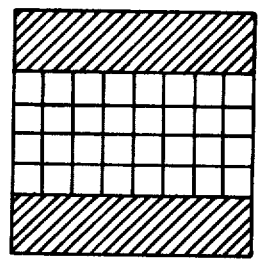
5th BIT
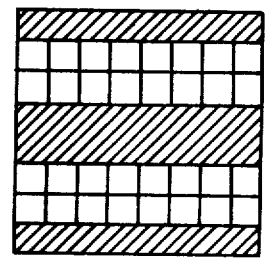
6th BIT
FIG. 5.

GUIDANCE SYSTEMS FOR MOBILE CRAFT

This invention relates to guidance arrangements and systems for mobile craft and in particular to guidance systems in which a missile is guided on to a target by means of a light beam.

It is known to guide a missile to a target by means of a light beam which is directed at the target, there being provided means carried by said missile for correcting its course so that it travels along the path of the light beam. Such systems are often called "beam riding" systems. The light beam has to be of sufficient width to ensure that the missile is not readily lost by its normal movement during flight. It is, therefore, possible for the missile to follow the path of the light beam, but be so positioned therewithin that an accurate hit is not achieved.

The present invention seeks to provide an improved guidance system and in particular an improved missile guidance system utilising a light beam in which the missile is enabled to determine its position within the beam.

According to this invention, a guidance system for a craft comprises means for tracking a beam of electro-magnetic energy in a direction to be followed by said craft and means for providing a sequence of different patterns of modulation across said beam whereby the position of said craft within said beam may be determined by the code generated by the said sequence of patterns as received by said craft due to its position.

Preferably said electro-magnetic energy is light in that part of the spectrum known as the "near infra-red". Most of the output of a xenon flash tube and the output of an Nd YAG laser, for example, is in this region.

Normally said craft will be a missile.

By providing control circuits within the missile this may thus be caused to follow a given track within the beam, normally the so called boresight, i.e. the central axis of the beam.

Preferably said modulation is intensity modulation and preferably said beam is pulsed off and on at each change of pattern of modulation.

Each pattern of modulation may be provided by a variation in intensity across the beam in one dimension in which case preferably a substantially linear relationship between intensity and angle is provided in said one dimension.

Said last mentioned pattern may be generated by means of a graded attenuating filter having an attenuation characteristic which increases in one direction across its width, in which case preferably said sequence of patterns is generated by means for rotating said filter in steps, each of part of a revolution and preferably said beam is circular in cross-section. Preferably said filter is rotated through 90° of revolution between each light pulse.

In a preferred embodiment of the invention, however, said beam is divided into an imaginary matrix of individual cells each of which is allocated a binary code word identifying the position of that cell within the cross-sectional area of said beam and each pattern of modulation is a pattern of spatial modulation consisting of sections of characteristic corresponding either to a digital "1" or to a digital "0", the arrangment being such that at each pattern said craft receives one bit of the binary code allocated to that individual cell in which said craft is situated at the time of reception.

Preferably the allocation of binary code words to said individual cells is in accordance with a Grey scale whereby the binary code allocated to one cell differs from the binary code allocated to any adjacent cell by one bit only. In this last mentioned case, and usually in fact, a whole section of one characteristic in a spatial pattern will encompass a plurality of said individual cells. Normally, said beam will be of square cross-section.

Preferably said sections of characteristic corresponding to a digital "1" are of comparatively high intensity while said sections of characteristic corresponding to a digital "0" are of comparatively low intensity, there being transmitted in addition to said sequence of patterns of spatial modulation a pulse providing said comparatively high intensity in all of said individual cells whereby said last mentioned pulse may be used as an amplitude and timing reference for the decoding of said sequence of patterns of spatial modulation.

Preferably again there is transmitted in addition to said sequence of patterns of spatial modulation at least two additional pulses for providing said craft with beam motion data. Preferably said two pulses are position modulated, one to provide information concerning beam motion in elevation and the other to provide information concerning beam motion in azimuth.

Preferably each craft carries four rearwardly directed light receiving means each arranged in a different quadrant and said missile contains means for utilising two of said light receiving means to derive a correction signal for pitch and the remaining two light receiving means to derive a correction signal for yaw, the outputs of all of said light receiving means being combined and applied to means for decoding said sequence of patterns of spatial modulation.

The source of said light beam in some examples is a xenon flash tube, but preferably said source of said light beam is an Nd YAG laser which is arranged to be pumped by a xenon flash tube.

At least where said craft is a missile, more than one missile may be provided to operate with said beam at the same time.

Figure 6:
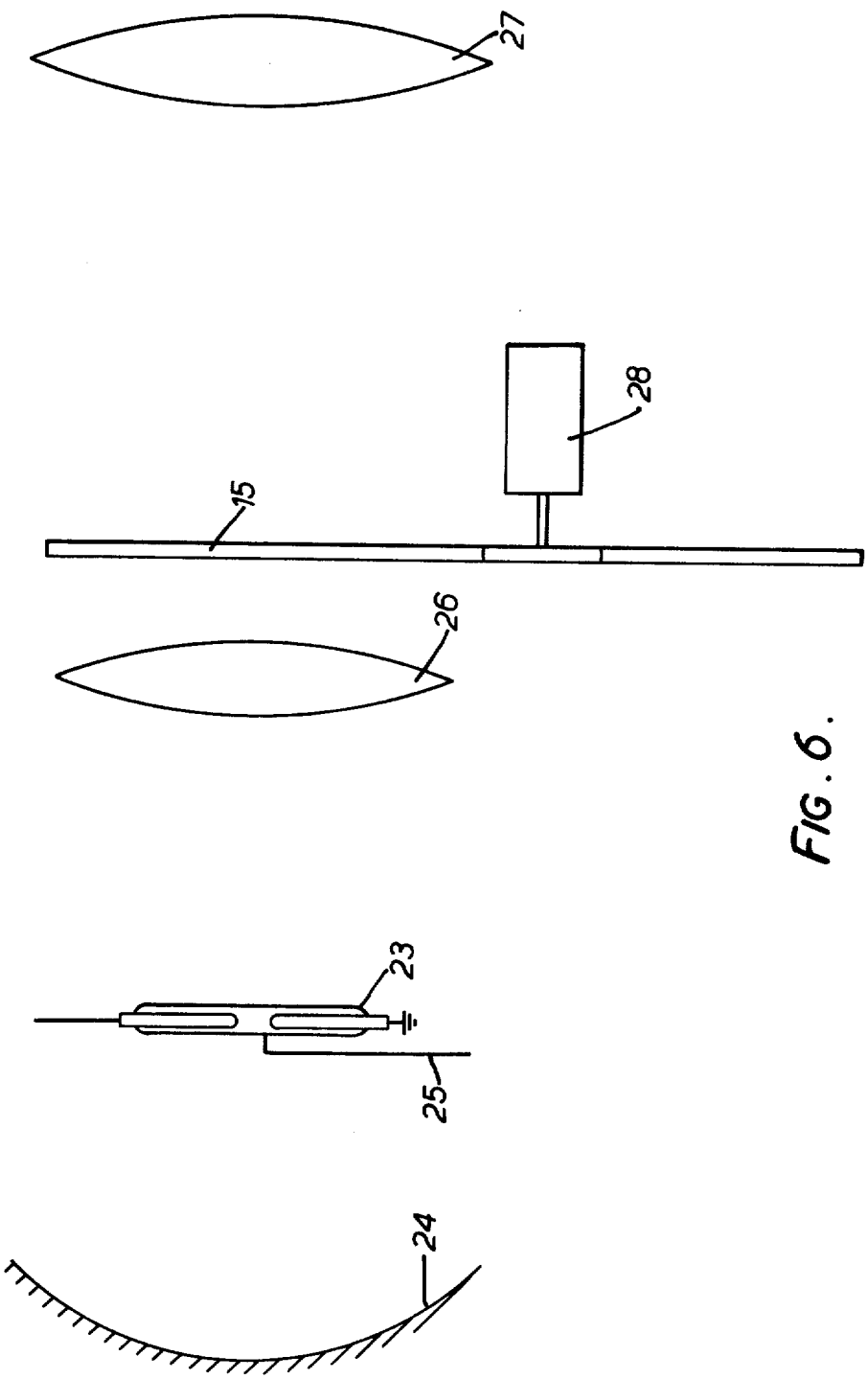
Figure 7:
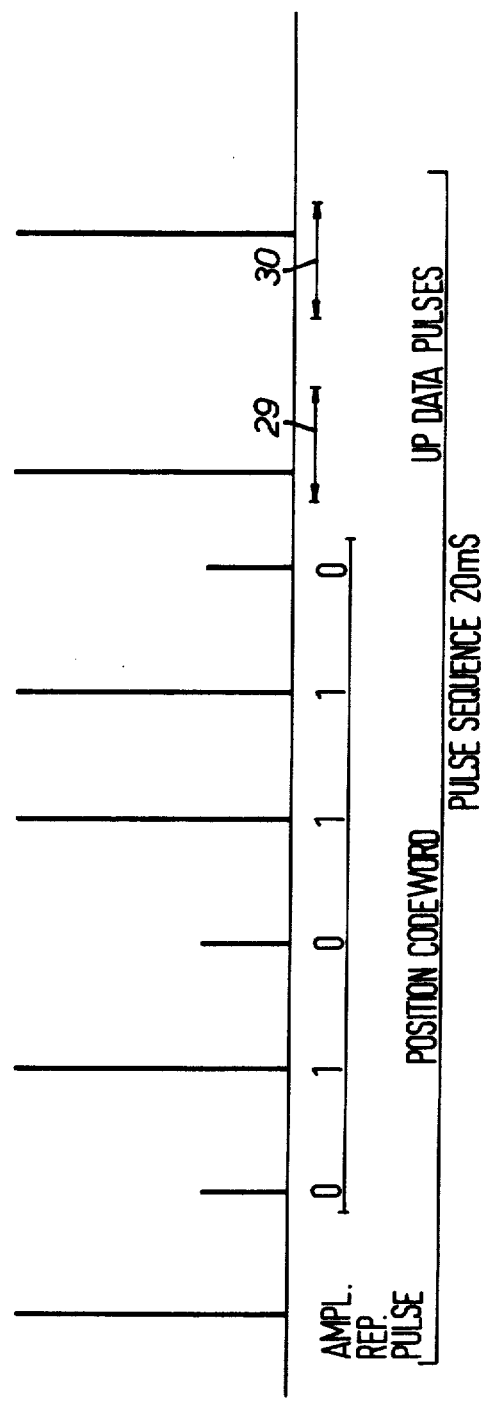
Figure 8:
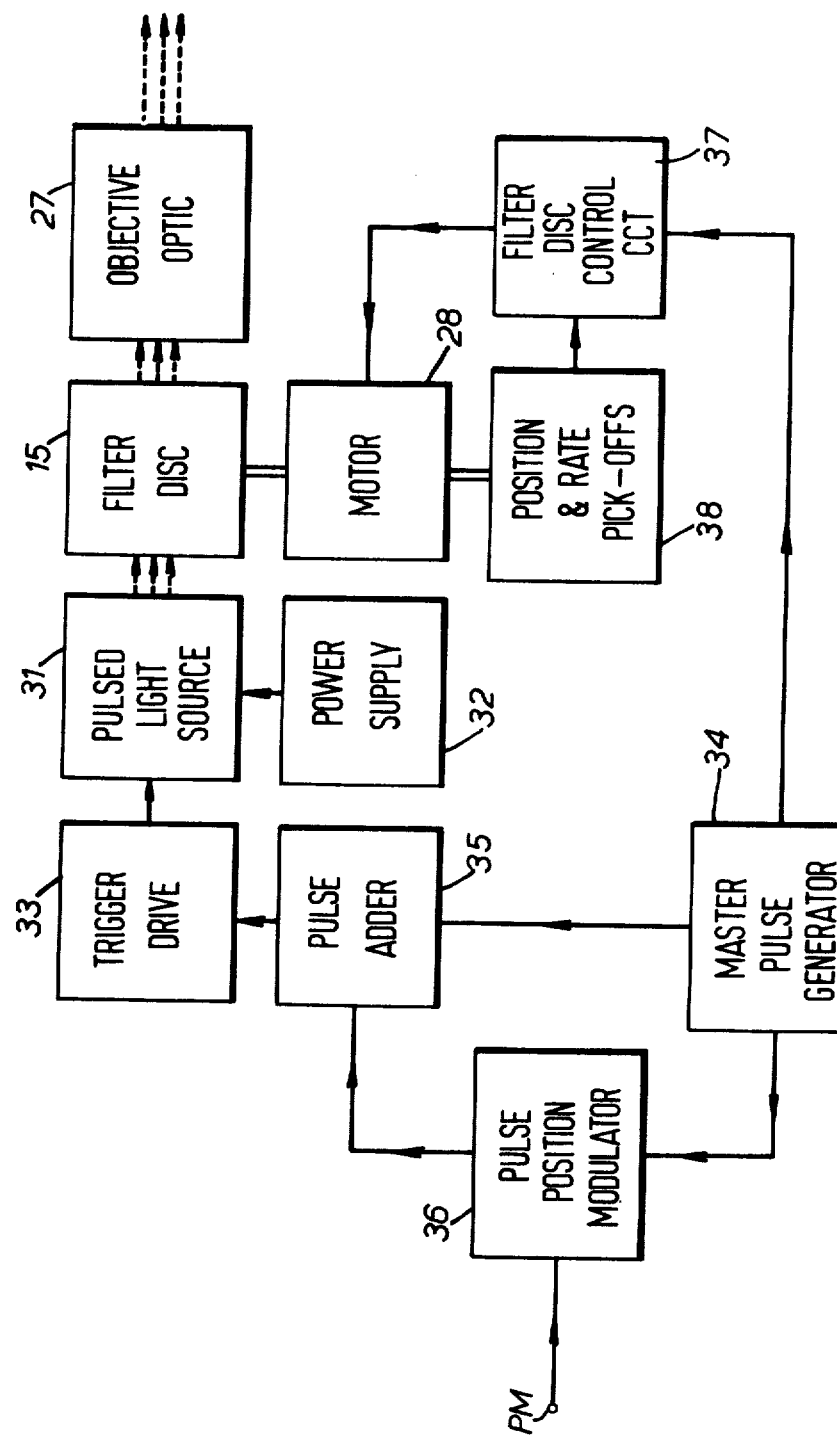
Figure 10:
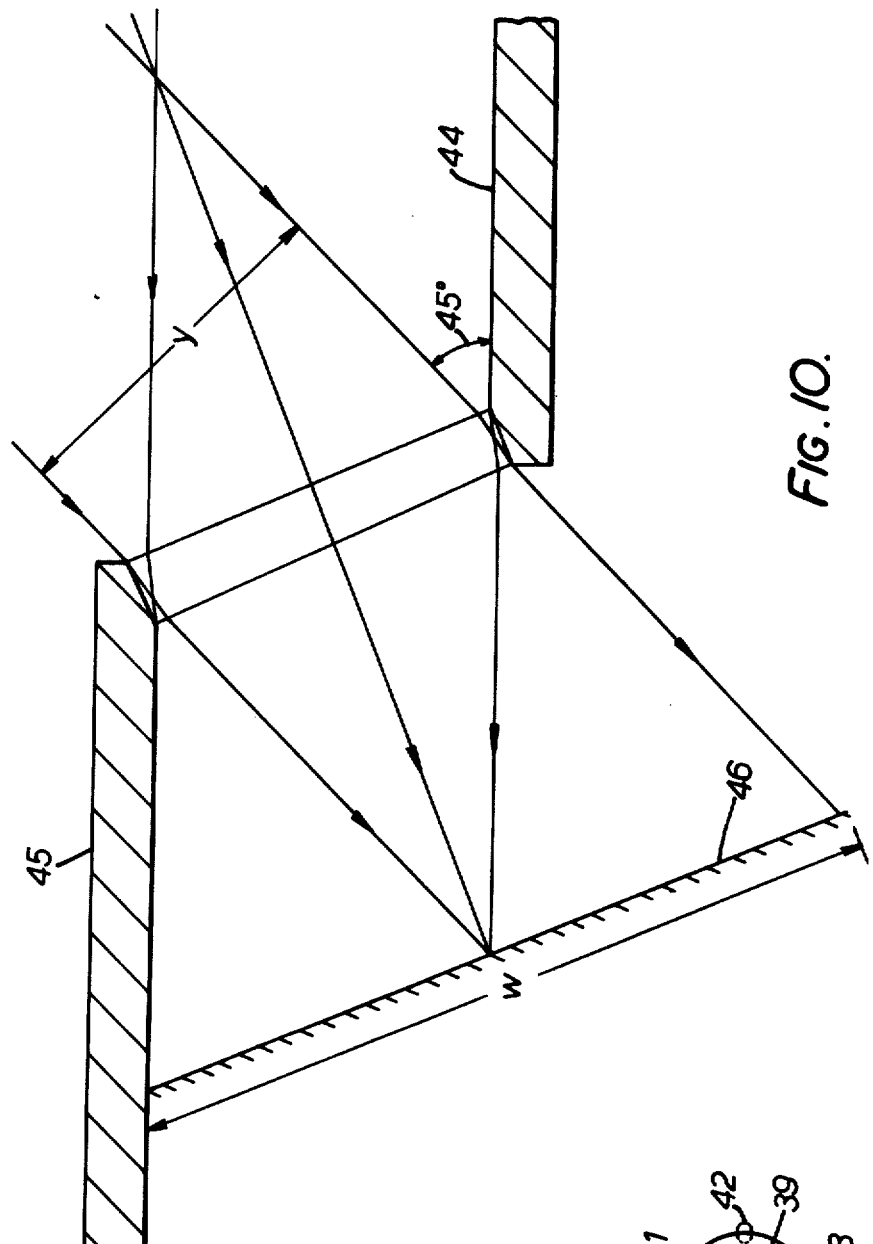
Figure 9:
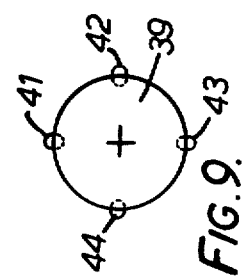
Figure 11A:
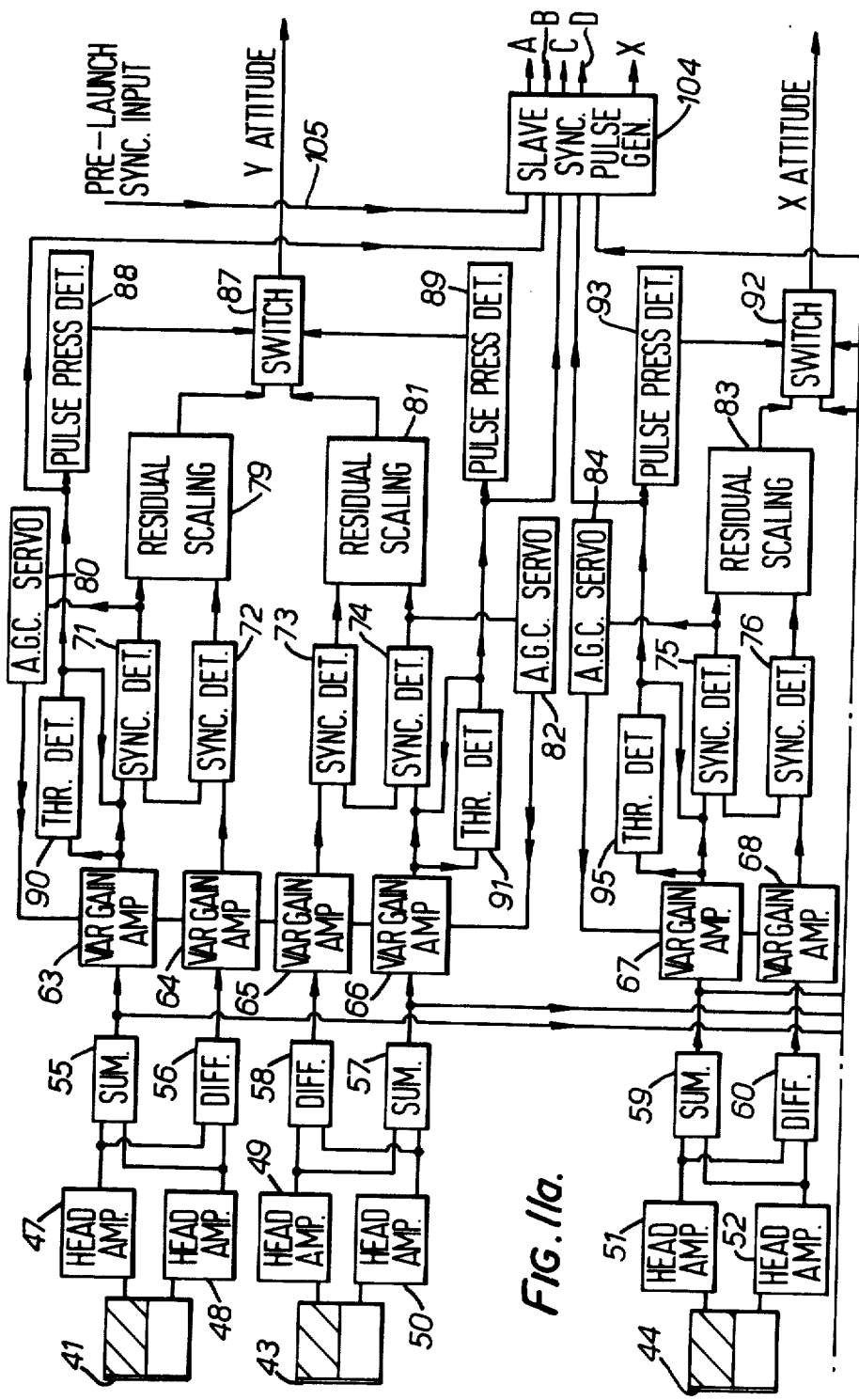
Figure 11B:
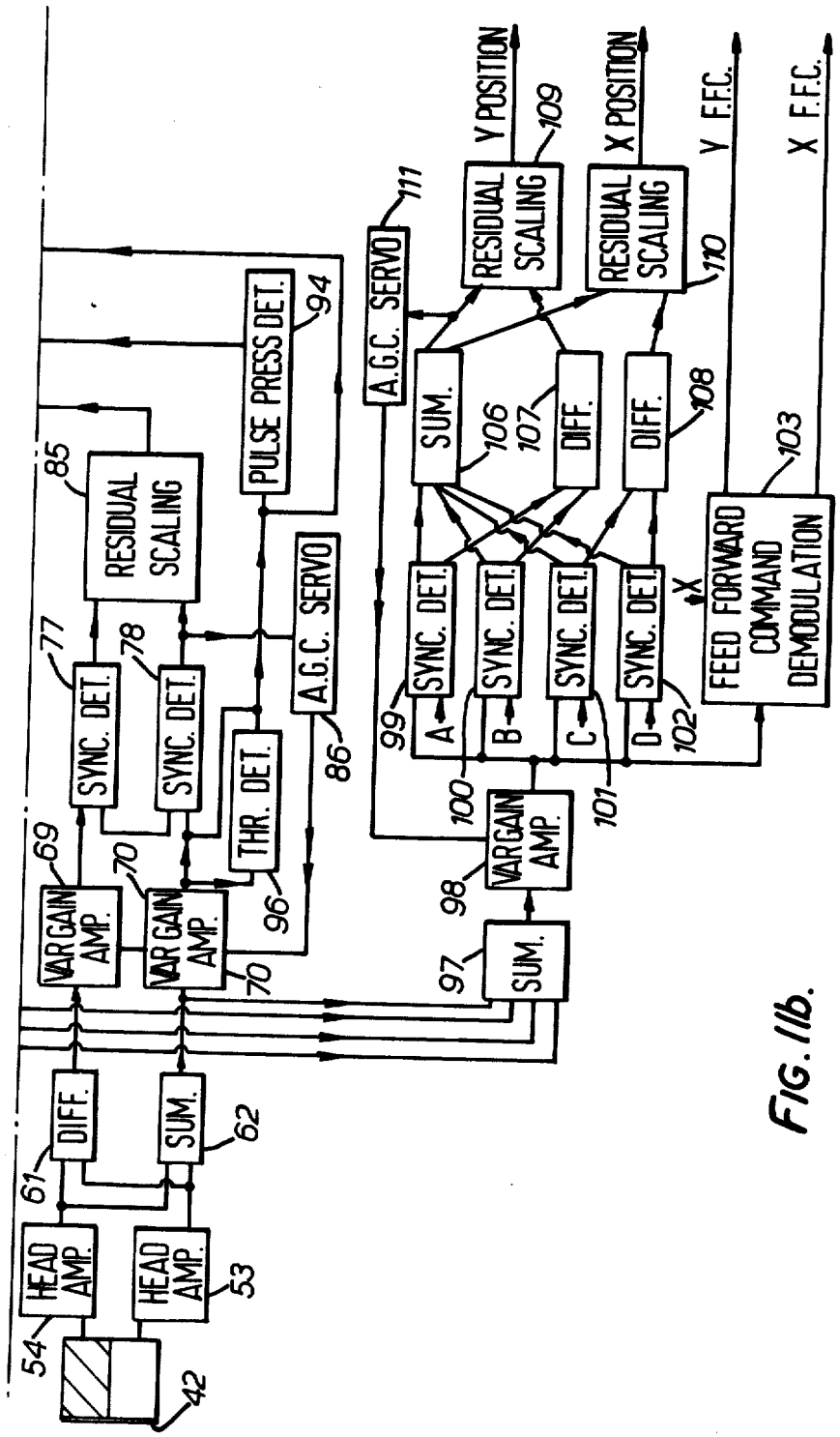

The invention is illustrated in and further described with reference to the accompanying drawings in which, FIG. 1 is a schematic diagram showing the general arrangement of a typical beam riding guidance system in accordance with the present invention, FIG. 2A is a schematic diagram illustrating an analogue encoding arrangement in one beam riding guidance system in accordance with the present invention, FIG. 2B is a diagram illustrating the amplitude distribution at the boresight, FIG. 2C is a diagram illustrating an amplitude distribution off boresight, FIG. 3A is a schematic diagram illustrating a digital encoding arrangement in a preferred beam riding guidance system in accordance with the present invention, FIG. 3B is a diagram illustrating the code received, FIG. 3C is a plan view of the disc magazine, FIGS. 4 and 5 are explanatory diagrams relating to the arrangement of FIG. 3, FIG. 6 is a diagram showing physical details of the light pulse transmitter 2 of FIG. 3, FIG. 7 is an explanatory graph relating to the sequence of pulses transmitted by the light pulse transmitter 2 of FIG. 3, FIG. 8 is a block schematic diagram of the light pulse transmitter 2 of FIG. 3, FIGS. 9 and 10 illustrate the mounting of the photodetectors on a missile in the preferred beam riding guidance system in accordance with the present invention and FIG. 11 is a block schematic diagram of the receiving and processing circuits within a missile in the beam riding guidance system in accordance with the present invention.

Referring to FIG. 1, this schematic diagram illustrates the basic principle of a missile beam riding guidance system in accordance with the present invention. Mounted on the ground 1 is a light transmitter 2 which transmits a narrow beam 3 of light towards a target 4. The boresight of the beam 3 is represented by the dashed line 5.

In order to provide guidance for a missile 6, the beam 3 is caused to track the target 4 either manually or by radar or by other means such as a laser target tracker. If intersection of the target 4 by the boresight 5 is maintained and if the missile travels along the boresight, contact with the target should occur.

The beam 3 has to be of sufficient width to ensure that the missile is not readily lost by its normal movement during flight. For this reason means are provided on the missile 6 for determining its position within the beam so that a control arrangement within the missile may effect such corrections to its course as are necessary to maintain its flight along the boresight 5. In order to achieve this a sequence of different patterns of intensity modulation is provided across the beam 3 and the beam 3 is pulsed on and off, the pattern of intensity modulation changing at each pulse. By this means a light receiver carried by the missile 6 and directed rearwardly will receive a code generated by the sequence of patterns which is related to the position of the receiver within the beam.

In addition, means are provided within the missile for receiving signals concerning tracking of the beam to follow the target 4. Such signals (termed "beam motion data") may be transmitted to the missile by a radio link. As described with reference to FIG. 6 et seq, however, in a preferred embodiment of the invention such beam motion data signals are transmitted by the beam itself.

Referring to FIG. 2, this illustrates in greater detail one form of intensity modulation which may be used and illustrates the form of code which will be received by the missile 6.

The pulse light transmitter is again represented by 2. The light beam 3 generated thereby, which is of circular cross-section, is passed through a graded attenuating filter 7. The grading of the filter is represented at 8 and is such as to provide a linear relationship between intensity and angle across the beam 3 in one dimension. Thus the beam 3 has an intensity pattern having a distribution as represented at 9. This pattern is in the nature of a circle 10 having a minimum intensity to one side 11 of the beam and a maximum intensity to the other side 12 of the beam.

The filter 7 is arranged to be rotated in the direction of the arrow 13 through 90° between each pulse from pulse transmitter 2. This has the effect of providing a sequence of four pulses, for two of which the intensity is graded in the azimuth direction, but in opposite sense, and for the other two of which the intensity is graded in the elevation direction. If it is assumed that the receiver of the missile 6 is positioned at R1, on boresight 5, this will receive four pulses all of the same amplitude as represented at (a). If, however, the receiver is positioned at R2, off boresight, pulses will be received, as represented at (b), which vary in amplitude. From the ratio of the amplitudes of the pulses, azimuth and elevation position may be derived by the control arrangement within the missile provided this is synchronised to the pulse transmitter 2 at the ground. Synchronisation is in practice maintained by means of a local oscillator within the missile's control arrangement which is phase locked via the received pulses. Initial phase lock is provided prior to the launch of the missile.

Referring to FIG. 3, in this case the beam 3 transmitted by the pulse transmitter 2 is of square cross-section. The beam is considered to be divided into a matrix of imaginary individual cells as represented at 14. It should be taken that the individual cells are in m rows and m columns giving a total of $m^2$ cells where m equal $2^n$ (where n is an integer). Each individual cell is allocated a binary code word of length 2n bits based upon its x and y co-ordinates within the matrix. The first n bits represent the x co-ordinate and the last n bits the y co-ordinate. A Grey scale code is used so that two adjacent cells will have code words which differ only in one bit, as represented at 14. The allocation of the different code words to the different individual imaginary cells is set out in detail in FIG. 4. Thus the imaginary cell shown shaded at 15' corresponds to the binary code word 101111.

The pulse transmitter 2 is arranged to emit a sequence of $2n+1$ pulses. The first pulse in the sequence is an amplitude reference pulse which is of full amplitude across the beam 3, i.e. it is of full amplitude in all of the individual imaginary cells. The remaining 2n pulses in the sequence are each allocated to the transmission of one bit of the code words of the cells. To achieve this a rotating disc magazine 15 carrying seven spatial filters referenced 16, 17, 18, 19, 20, 21 and 22 is mounted such that each spatial filter 16 to 22 is presented to the beam 3 successively. One spatial filter 16 to 22 is substituted for the preceding filter 16 to 22 between each pulse by the transmitter 2.

Each spatial filter is such that the bit assumes its correct value (i.e. "1" or "0") in each individual imaginary cell. This is best seen from the plan view of the magazine disc 15 shown at FIG. 3c in and from FIG. 5 which relates the different regions of the spatial filters 16 to 22 to the individual imaginary cells of the beam 3.

Whenever an attenuating section (shown shaded) of a filter encompasses an individual imaginary cell, the corresponding binary bit for that cell is "0". On the other hand whenever a highly transmissive section of a filter encompasses an imaginary cell, the corresponding binary bit for that cell is a "1". A reduced amplitude pulse, rather than the total absence of a pulse is used to represent a binary "0" so as to enable the receiver to distinguish between a binary "0" and absence of signal due to efflux obscuration. The threshold level between a binary "1" and a binary "0" is set in relation to the reference pulse transmitted at the beginning of a sequence which is, of course, a full amplitude (a full binary "1") in all of the individual cells. The threshold is set at some value below this full amplitude.

At the end of a sequence of pulses the missile's receiver will have received a complete code word depending upon the particular individual cell in which its receiver is situated. Decoding as an example the cell shaded at 15' in FIG. 3 and referring to FIG. 4 it will be seen that the first pulse it receives will be the amplitude reference pulse which is also used as a timing reference, the second pulse (first bit) will be a full amplitude, the third pulse (second bit) will be of reduced amplitude, the fourth pulse (third bit) will be of full amplitude as will the fifth pulse (fourth bit), sixth pulse (fifth bit) and the seventh pulse (sixth bit). As has already been mentioned this code word provides when decoded, the missile with its position within the beam in Cartesian coordinates. This enables the missile's control arrangement to adjust the course of the missile closer to boresight.

In view of the use of a Grey code, since only one bit of the code word changes as the missile moves from one cell to an adjacent cell, a meaningful code word will be received even if the missile crosses from one cell to another during a pulse sequence.

Whilst the digital coding system described with reference to FIGS. 3, 4 and 5 tends to require more transmitter power for a given range compared with the analogue coding system described with reference to FIG. 2, nevertheless this system is preferred primarily because the positional data which is provided is, within limits, independent of amplitude variation within the beam. With the analogue system of FIG. 2 noise tends to increase with range. For practical purposes the only noise of significance in the digital system of FIGS. 3 to 5 is due to quantisation error which tends to remain constant with range up until the point at which reception errors occur.

Referring to FIG. 6, this illustrates a pulse light transmitter which may be used with the arrangement described with reference to FIGS. 3 to 5. The transmitter consists of a xenon flash tube 23 mounted in front of spherical reflector 24. The trigger lead for the flash tube 23 is represented at 25. The light beam thus produced is passed through a condensing lens 26 and an objective lens 27. On the side of the condensing lens 26 remote from the flash tube 23 is mounted the magazine filter disc 15 of FIG. 3. The rotational drive for the disc 15 is provided by an electric motor 28. In essence the optical layout of the transmitter is basically similar to that of a slide projector but with a xenon flash lamp instead of a tungsten bulb and the magazine filter disc 15 in place of the normal slide of the projector.

The flash tube 23 is of the short arc type in order to provide an intense source.

The beamwidth produced is 60 mrad with a 8×8 array of individual imaginary cells. This should result in a maximum angular error due to quantisation of ±3.75 mrad.

In addition to the seven pulses in the sequence already referred to (the amplitude and timing reference pulse and the six pulses to provide the six bits of the code words) two further pulses (both at full amplitude for all individual imaginary cells) are added to the sequence in order to transmit beam motion data to the missile and to avoid the necessity for a separate command link to ensure that the missile moves with the beam as the beam tracks. The two additional pulses are pulse position modulated with beam motion data, one pulse being allocated to azimuth data and the other to elevation data. The total pulse sequence is then as set out in FIG. 7 for the individual cell 15′ shown shaded in FIG. 3. The final two pulses in the sequence are the beam motion data pulses, the arrows 29 and 30 representing their position modulation. The whole sequence would be repeated at 50 Hz in order to supply a position data output with a bandwidth of 25 Hz. Thus the overall transmitter pulse repetition frequency is 450 Hz.

Typically the pulse energy figure for a short arc xenon flash tube is 0.5 joule, resulting in a power dissipation of 225 watts. Whilst water cooling of the flash tube is to be preferred, with power dissipations of the order of 225 watts, it is possible that forced air cooling would suffice.

A flash tube running at 0.5 joule may be expected to generate 17 kW pulses, each 2 $\mu$S long. It is likely, however, that only a relatively small fraction of the total available power may be concentrated into the transmitted beam due to limitations inherent in the optical system. A typical peak power in the beam would be 2 kW. In a modification of the pulse transmitter shown in FIG. 6, the output of the xenon flash tube, instead of being used directly, is utilised to pump an Nd YAG laser which provides an output which is utilised as the beam. Whilst the efficiency of an Nd YAG laser tends to be poor and indeed the average output would be lower than that of the pulse transmitter described with reference to FIG. 6, such an arrangement would provide a number of advantages as follows:

(a) The power from an Nd YAG laser may be concentrated into shorter pulses.

(b) The emission takes the form of a narrow beam which can be shaped to provide a 60 mrad beam without involving the collection loss involved in collinating the output of a xenon tube.

(c) The output is monochromatic allowing narrow spectrum band filtering at the receiver with consequent reduction in background induced shot noise.

(d) The output of the Nd YAG laser is at a longer wavelength (1.06 $\mu$M) which tends to be less effected by atmospheric attenuation.

Referring to FIG. 8, this is a block schematic diagram showing the overall arrangement of the pulse transmitter 2 of FIG. 3. The pulsed light source (a xenon flash tube alone, or Nd YAG laser pumped by a xenon flash tube) is represented by the block 31. A power supply for the pulsed light source 31 is represented at 32. The pulsed light source 31 is provided to be triggered by a trigger drive circuit 33 which derives controlling input from a master pulse generator 34 via a pulse adder 35. Pulse adder 35 derives an input from a pulse position modulator 36 which itself derives a reference input from master pulse generator 34. Modulating input for pulse position modulator 36 is applied to terminal 37. This modulating input is azimuth and elevation beam motion data, the whole arrangement being such that the positions of the last two pulses in the sequence is dependent upon the motion of the beam in azimuth and elevation respectively. The filter disc 15 of FIG. 6 is represented by the block 15, whilst the objective lens 27 of FIG. 6 is represented by the block 27. The driving motor 28 of FIG. 6 is represented by the block 28 and is shown controlled by a control circuit 37 which derives timing signals from master pulse generator 34 and signals relating to the position and rate of the motor 28 from "pick-offs" represented by the block 38.

Referring to FIG. 9, the missile 39 is provided with four rearwardly facing photodetectors 40, 41, 42 and 43, each lying in a different quadrant. Each photodetector is arranged behind an aperture as illustrated in FIG. 10 which is a scale drawing of one practical arrangement. In FIG. 10 the outer wall of the missile is represented at 44 where its outside diameter is 134 mm and at 45 which its outside diameter is 145 mm. The photodetector is represented at 46 and is of width W equal to 0.75 mm. The aperture is closed by a glass window of thickness 0.8 mm and N=1.52. With this configuration the "worst case" aperture Y is 4.6 mm.

Each photodetector 40 to 43 is a two element photodiode detector arranged so that when the missile is receiving light from a point exactly behind the missile one element is illuminated whilst when the light comes from a point corresponding to maximum body to beam angle (45° in this case) the other is illuminated. The ratio of signal from the two elements is therefore proportional to the body to beam angle. Two diametrically opposite ones (41 and 43 say) of the four photodetectors measure pitch, each covering half of the total range, whilst the remaining two (42 and 44) measure yaw.

All four of the photodetectors are combined to determine the missile's position within the beam.

A block schematic diagram of the control circuit within the missile is shown in FIG. 11 to which reference will now be made.

The four photodetectors, with their two elements, are again referenced 41 to 44. Each element of detectors 41, 43, 44 and 42 is connected to a head amplifier 47, 48, 49, 50, 51, 52, 53 and 54 respectively.

The sum and difference of the outputs of head amplifiers 47 and 48 are determined respectively by sum and difference circuits 55 and 56.

The sum and difference of the outputs of head amplifiers 49 and 50 are determined respectively by sum and difference circuits 57 and 58.

The sum and difference of the outputs of head amplifiers 51 and 52 are determined respectively by sum and difference circuits 59 and 60.

The sum and difference of the outputs of head amplifiers 53 and 54 are determined respectively sum and difference circuits 61 and 62.

Each of sum and difference circuits 55, 56, 57, 58, 59, 60, 61 and 62 is connected to a respective variable gain amplifier 63, 64, 65, 66, 67, 68, 69 and 70.

Each of variable gain amplifiers 63 and 64 is connected to a respective one of two paired synchronous detectors 71 and 72.

Each of variable gain amplifiers 65 and 66 is connected to a respective one of two paired synchronous detectors 73 and 74.

Each of variable gain amplifiers 67 and 68 is connected to a respective one of two paired synchronous detectors 75 and 76.

Each of variable gain amplifiers 69 and 70 is connected to a respective one of two paired synchronous detectors 77 and 78.

The outputs of synchronous detectors 71 and 72 are applied to a residual scaling circuit 79 while the output of synchronous detector 71 is also connected via an automatic gain control servo circuit 80 to control the gain of variable gain control circuits 63 and 64.

The outputs of synchronous detectors 73 and 74 are applied to a residual scaling circuit 81 while the output of synchronous detector 74 is also connected via an automatic gain control servo circuit 82 to control the gain of variable gain control circuits 65 and 66.

The outputs of synchronous detectors 75 and 76 are applied to a residual scaling circuit 83 whilst the output of synchronous detector 75 is also connected via an automatic gain control servo circuit 84 to control the gain of variable gain control circuits 67 and 68.

The outputs of synchronous detectors 77 and 78 are applied to a residual scaling circuit 85 while the output of synchronous detector 78 is also connected via an automatic gain control servo circuit 86 to control the gain of variable gain control circuits 69 and 70.

Residual scaling circuits 79 and 81 are connected to a selector switch 87 which selects output from residual scaling circuit 79 when a pulse presence detector circuit 88 detects a pulse at its input, and output from residual scaling circuit 81 when a pulse presence detector circuit 89 detects a pulse at its input. Pulse presence detector circuit 88 derives its input, via a threshold circuit 90, from the output of variable gain amplifier 63 whilst pulse presence detector circuit 89 derives its input, via a threshold circuit 91, from the output of variable gain amplifier 66.

Residual scaling circuits 83 and 85 are connected to a selector switch 92 which selects output from residual scaling circuit 83 when a pulse present detector circuit 93 detects a pulse at its input, and output from residual scaling circuit 85 when a pulse present detector circuit 94 detects a pulse at its input. Pulse presence detector circuit 93 derives its input, via a threshold circuit 96, from the output of variable gain amplifier 67.

The outputs of switches 87 and 92 provide control signals for correcting the attitude of the missile in respective co-ordinate directions so as to counteract pitch and yaw. The means for achieving such correction is not illustrated but may be as known per se.

The circuitry so far described is concerned with correcting for the attitude of the missile and not for correcting its position within the beam so that it travels on boresight. The circuitry involved in this last mentioned task will now be described.

The outputs of summing circuits 55, 57, 59 and 62 are connected to a summing circuit 97 so that the outputs of all of the elements of the photodetectors 41 to 44 are combined. The output of summing circuit 97 is connected to a variable gain amplifier 98, the output of which is connected in parallel to four synchronous detectors 99, 100, 101 and 102 and a "feed forward command" demodulation circuit 103. This last mentioned circuit is provided to demodulate the position modulation of the two pulses added to the sequence of pulses transmitted by the light pulse transmitter on the ground in order to provide co-ordinate control signals for use in altering the course of the missile in correspondence with beam motion as the beam tracks a target.

Synchronous detectors 99 to 102 and demodulation circuit 103 have applied at inputs A, B, C, D and X respectively reference synchronising signals from a slave synchronising pulse generator 104. This last mentioned generator is phase locked by means of pulses derived from the threshold detectors 90, 91, 95 and 96. These pulses originate, of course, from the light pulses in the beam and primarily from the amplitude reference pulse which is always seen as of full amplitude. The generator 104 is also arranged to be synchronished before launch, but means of lead 105, as already mentioned.

Synchronous detectors 99 to 102 are connected to a summing circuit 106. Synchronous detectors 99 and 100 are connected to a difference circuit 107 whilst synchronous detectors 101 and 102 are connected to a difference circuit 108.

Summing circuit 106 provides an input for an automatic gain control servo 111 which is connected to control the gain of variable gain amplifier 98.

Sum and difference circuits 106 and 107 are connected to a residual scaling circuit 109 whilst sum and difference circuits 106 and 108 are connected to residual scaling circuit 110. Scaling circuits 109 and 110 provide co-ordinate control signals which are also used to control the track of the missile but in this case in order to direct the missile along boresight.

I claim:

1. Apparatus for guiding a craft comprising, means for projecting a beam of electromagnetic energy along a beam path to be followed by a moving craft, means for making different parts of the beam distinctive as to predetermined modulation parameters thereof from other parts so that the craft may establish in what part of the beam it is located, and means for imposing on the beam a code which contains data concerning the movement of the beam path whereby the craft may establish in what direction it should move to remain under the control of the beam.

2. In a guidance system which comprises means for projecting a beam of electromagnetic energy along a beam path to be followed by a moving craft, means for making different parts of the beam distinctive as to predetermined modulation parameters thereof from other parts so that the craft may establish in what part of the beam it is located, and means for imposing on the beam a code which contains data concerning the movement of the beam path whereby craft may establish in which direction it should move to remain under the control of the beam, a craft, means on said craft for receiving the electromagnetic energy, means on said craft for producing first signals indicative of the part of the beam which is received, and means on said craft for producing second signals dependent on the said code.

3. Apparatus as claimed in claim 1 wherein said means for making different parts of the beam distinctive from the other parts includes intensity modulation means.

4. Apparatus as claimed in claim 3 wherein the means for projecting the beam is adapted to pulse the beam on and off and for making different parts of the beam distinctive is adapted to change the modulations of at least one said part of the beam between successive pulses.

5. Apparatus as claimed in claim 1 wherein said means for making different parts of the beam distinctive is adapted to provide a variation in intensity across the beam in one dimension.

6. Apparatus as claimed in claim 1 wherein said means for making different parts of the beam distinctive includes means for modulating each said part to provide a binary code word identifying the position of that beam part.

7. Apparatus as claimed in claim 6 wherein the means for modulating is in accordance with a gray scale whereby the binary code allocated to one cell differs from the binary code allocated to any adjacent cell by one bit only.

8. Apparatus as claimed in claim 6 wherein said means for modulating is constructed to denote different binary digits by different intensities of the beam parts and the means for projecting the beam is adapted to transmit a pulse providing a comparatively high intensity in all of said individual beam parts whereby said pulse may be used as an amplitude and timing reference for the decoding of said binary codes.

9. Apparatus as claimed in claim 1 wherein said means imposing on the beam a code containing data concerning the movement of the path provides pulse position code.

10. Apparatus as claimed in claim 9 wherein said imposing means produces two pulses, both position modulated, and representing motion in elevation and azimuth respectively of the beam path.

11. In a guidance system as claimed in claim 2 wherein the said craft carries four rearwardly directed receiving means each arranged in a different quadrant and said craft contains means for utilising two of said receiving means to derive a correction signal for pitch and the remaining two receiving means to derive a correction signal for yaw, means on said craft for combining the outputs of all of said receiving means, and receiving said combined outputs for decoding said sequence of patterns of spatial modulation.

12. Apparatus as claimed in claim 1 wherein said means for projecting comprises a xenon flash tube.

13. Apparatus as claimed in claim 1 wherein said means for projecting comprises an Nd YAG laser which is arranged to be pumped by a xenon flash tube.

14. In a guidance system for a craft, the combination of:

source means for projecting a beam of electromagnetic energy along a path toward a target and means for causing said source means to track said target whereby said path may change in azimuth and elevation; and modulating means for causing different cross-sectional regions of said beam to be distinctive as to predetermined modulation parameter thereof with respect to each other and for coding said beam to contain information concerning azimuth and elevation of said path.

15. In a guidance system as defined in claim 14 including receiving means on said craft receiving said different regions of the beam for producing a first signal indicative of the location of the craft within said beam with respect to the centerline of the beam and for producing a second signal indicative of the change in azimuth and elevation of said path.

16. In a guidance system which comprises source means for projecting a beam of electromagnetic energy along a path toward a target and means for causing said source means to track said target whereby said path may change in azimuth and elevation; and modulating means for causing different cross-sectional regions of said beam to be distinctive as to predetermined modulation parameter thereof with respect to each other and for coding said beam to contain information concerning azimuth and elevation of said path, a craft, receiving means on said craft receiving said different regions of the beam for producing a first signal indicative of the location of the craft within said beam with respect to the centerline of the beam and for producing a second signal indicative of the change in azimuth and elevation of said path.

17. In a guidance system as defined in claim 15 including receiving means on said craft adapted to receive said different regions of the beam for producing a first signal indicative of the location of the craft within said beam with respect to the centerline of the beam and for producing a second signal indicative of the change in azimuth and elevation of said path.

* * * * *